Feb. 21, 1956   J. L. CLOUDSLEY   2,735,515
FLUID PRESSURE RELIEVING APPARATUS
Filed Feb. 27, 1951   2 Sheets-Sheet 1
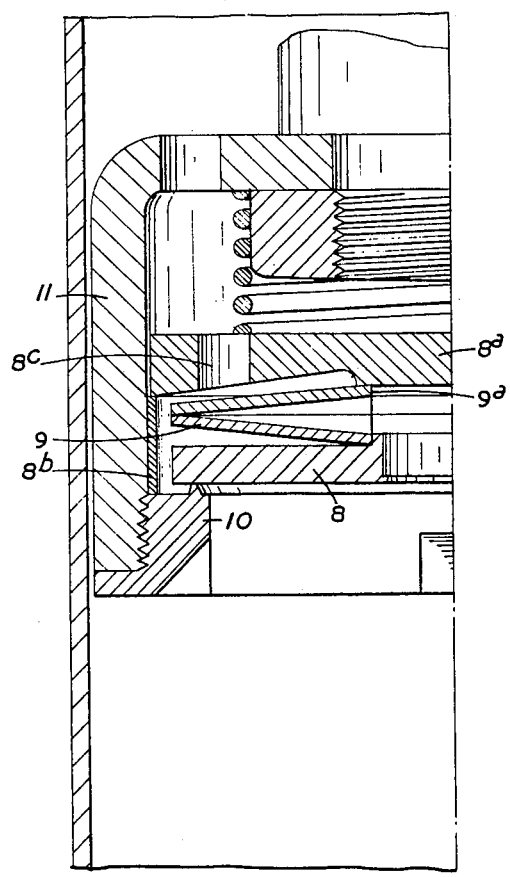
FIG./.
John Leslie Cloudsley
Inventor
By
Attorneys.

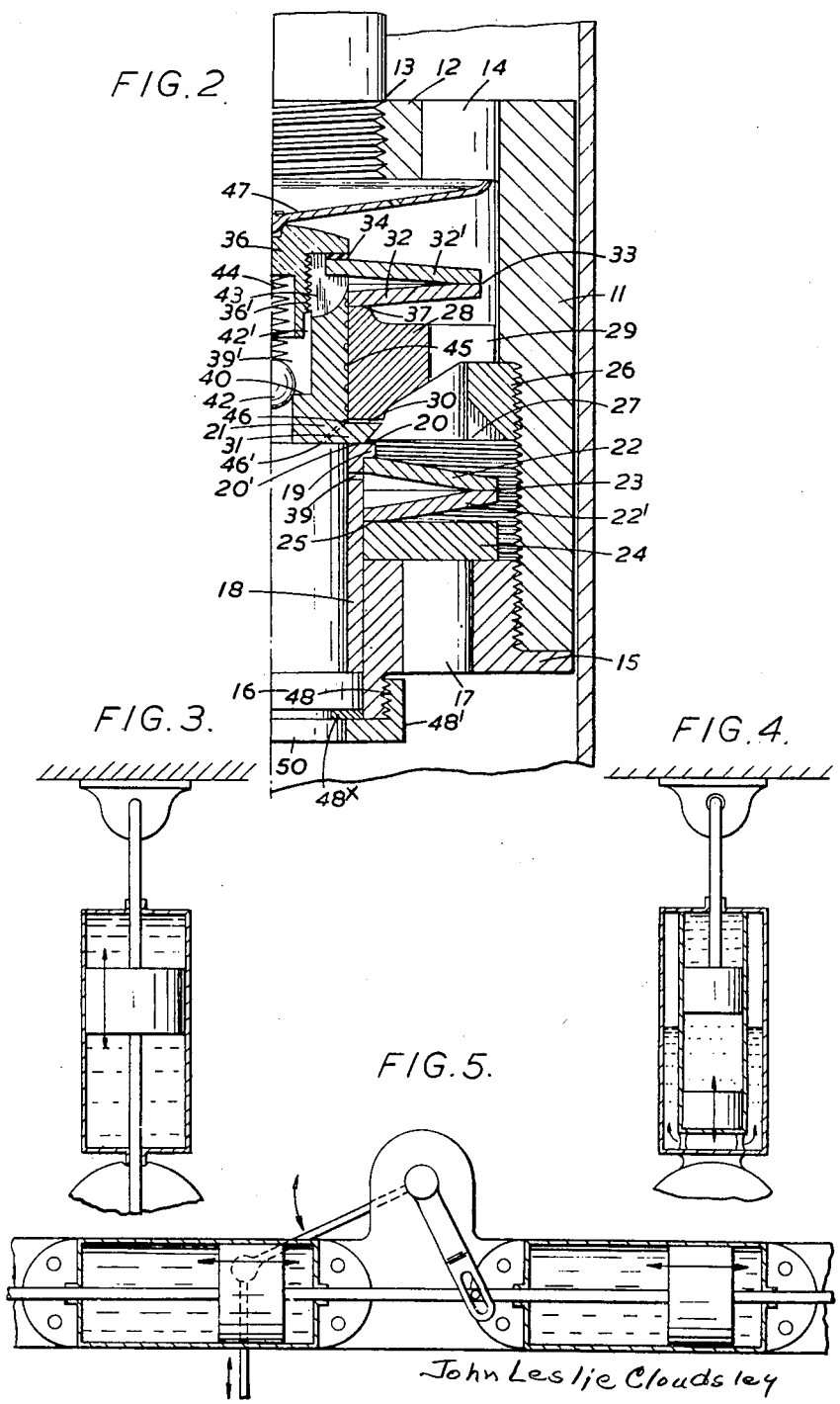

United States Patent Office 2,735,515
Patented Feb. 21, 1956

2,735,515

FLUID PRESSURE RELIEVING APPARATUS

John Leslie Cloudsley, West Wycombe, England

Application February 27, 1951, Serial No. 212,851

2 Claims. (Cl. 188—88)

This invention relates to fluid pressure relieving apparatus of the kind in which fluid is enabled to pass relatively freely from one chamber to another through a port or passage but is restricted in passing in the opposite direction.

One of the important applications of fluid pressure relieving apparatus of the kind referred to is in the construction of shock-absorbers of the kind in which the desired shock absorbing effect is obtained by resistance set up by restricting the circulation of fluid such as oil from one side of a damping piston to the other side thereof.

A particular form of pressure relieving device of the above stated kind is described an illustrated in the specification of my United States Patent No. 2,521,202. In the complete specification of that patent I described a shock-absorbing through-way piston and associated valve- and dashpot unit comprising a plurality of flat steel washers or annular laminae forming a laminar valve. This valve bears near its periphery against an annular seat formed inside the piston and bears near its central aperture against a valve bearing member away from which it becomes deflected for the passage of oil from one side of the piston to the other when the piston performs its pressure stroke. Attached to the valve bearing member is a diaphragm forming one wall of a dashpot chamber. Under certain circumstances oil under pressure deflects the laminar valve away from the valve bearing member as already stated, and oil entering the dashpot chamber causes the diaphragm wall thereof to advance and carry with it the valve bearing member attached thereto in a follow-up movement with respect to the laminar valve.

I have found that in practice a laminar valve made up of flat annular laminae is not the most suitable form of valve to use owing to the tendency of the laminae to deform and become fatigued should they become over-deflected. Also the degree of deflection of such laminae permitted within their safe-load stressing is small and this in turn makes the control of oil into the dashpot very sensitive. Moreover, if oil finds its way between the laminae or an assembly thereof they tend to buckle and render control indeterminate.

The chief object, therefore, of the present invention is to provide an improved form of fluid pressure relieving apparatus of the above stated kind and in particular to obviated the disadvantages above referred to. A subsidiary object of the invention is to prevent rapid deterioration of the valve due to repeated movement thereof to an excessive extent.

According to the present invention I provide improved fluid pressure relieving apparatus of the kind referred to characterised by the fact that the restricted flow of fluid takes place by deflection of a valve member of the dished resilient annular disc or so-called Belleville washer type away from a circular seat, the fluid opening presented for the restricted flow of fluid being situated between the inner periphery of the annular disc or washer and a co-operating valve seating surface. I employ two or three such washers and in the case of using them in pairs they may be placed rim to rim so as to enclose a cavity into and from which some of the operating fluid may pass as deflection occurs. Excessive deflection of such set of washers in a shock absorbing apparatus may be prevented by employing a flow-constricting plate or obturator providing a through-flow area equal to the maximum size of valve opening allowable by movement of the valve member off its seat without doing harm to the valve. Such a plate may, for example, be a plain rigid disc having a central aperture. If desired, the centrally apertured disc may be one of a set of discs differently apertured, this being particularly advantageous in the case of using as a valve two or more Belleville washers differing in their resistance to deflection. It will be understood that if such a valve is changed, a flow constricting plate or obturator of corresponding flow obstructing value is required. It will be understood that by the employment of such a flow-restricting plate or obturator in conjunction with a fluid-pressure relief valve member of the Belleville washer type, excessive movement thereof is prevented hydraulically as distinct from mechanically, by the use, for example, of a movement-limiting stop. As soon as the valve member tends to be lifted or deflected excessively by excessive fluid pressure the flow of fluid past the valve opening is checked at the constriction plate or obturator, and a back pressure builds up to counteract the excessive operating pressure.

The invention will now be described more fully with reference to the accompanying drawings in which:

Figure 1 is a half-sectional view of a fluid pressure relief valve having a Belleville washer type of valve member in combination with a flow-constricting plate or obturator in accordance with the invention.

Figure 2 is a half-sectional view of the invention applied to the piston of a telescopic type liquid shock absorber apparatus.

Figure 3 is a diagrammatic illustration of a liquid shock absorber interposed between a vehicle chassis member and an axle, the apparatus of the present invention being assembled in the piston.

Figure 4 is an illustration similar to Figure 3 but in which the apparatus is in both the piston and in the cylinder base, the cylinder having a supplementary surrounding cylinder or double wall with intervening space to provide an overflow chamber for the liquid in excess of the underside of the piston when descending, because in this form of shock absorber the piston rod does not extend from the lower side of the piston to compensate for the rod on the upper side.

Figure 5 is an illustration of a double piston arrangement between a chassis and an axle, the apparatus of the present invention being embodied in both pistons.

Referring now to Figure 1, the relief valve apparatus shown comprises a centrally apertured plate 8 pressed by a Belleville washer 9 onto a seating ring 10. A second plate 8a is pressed down by a spring shown against the inner periphery of the valve member, shown here in the form of an upper Belleville washer 9a and provides a seating surface for said inner periphery, the compressing effect of the plate 8a being limited by a distance ring 8b. The parts just described are assembled in a hollow piston 11 movable along a cylinder, the whole forming part of a piston type liquid shock absorber. When the piston moves downwards, the liquid pressure developed in front of it lifts the valve member 8 off its seating ring, thereby allowing the liquid to pass up through holes 8c in the upper plate 8a to the top side of the piston. On the upstroke of the piston, the liquid pressure developed above the piston presses the upper Belleville washer away from seating contact with the underside of the plate 8a and thereby allows liquid to pass to the underside of the piston and out through the central aperture of the plate 8, this aperture being equal in area to the area of the cylindrical gap developed by the maximum desired movement of the upper Belleville washer when displaced from contact with the underside of the plate 8a.

Referring now to Figure 2, the reference numeral 11 indicates a piston movable along the cylinder of a liquid shock-absorber and formed at its upper end with an internal flange 12 thereby providing a central hole 13 for attachment to a piston rod. Displaced radially from the centre hole are a number of holes 14 in the flange 12 for the passage of fluid, such as oil, therethrough. The other end of the cylindrical piston 11 is fitted with a plug 15; this plug has a central passage 16 bored through it and a number of holes 17 displaced radially from the centre passage. In the passage 16 is fitted slidably a valve member 18 in the form of a valve plunger having at its top end a flange 19; the upper surface of this flange is faced smoothly at 20 to bear against a valve seating member 21. The underside of flange 19 is faced smoothly to form a sealing seat for the upper surface of the inner periphery of a Belleville spring disc 22, the lower face of which at its outer periphery is smoothly faced to form a seal with the upper face of another Belleville spring disc 22' at 23. The valve plunger 18 is a guide for the spring discs 22, 22' and these two discs together with the valve plunger 18 and its flange 19 are in effect a valve member seated circularly against the underface 20' of the valve seating member 21 through the intervention of the flange 19 of the said valve plunger 18 which in its relation to the underface of the valve seating member 21 is only indistinguishable from the inner periphery of the spring disc 22 by reason of its functioning also as a guide to keep the outer peripheries of the two discs 22, 22', in register and thus maintain the oil seal. In this respect, therefore, the said flange 19 and the disc 22 are to be regarded as unitary. A port 39 is provided in the wall of the valve plunger 18 to permit oil to pass to and from the cavity between the discs 22 and 22'. The bottom face of the spring disc 22' is faced smoothly at its inner periphery to form a seal with an annular plate 24 at 25. It will be seen that the parts 22, 22' and 24 are guided on the part 18 which is slidable through them, and is itself guided in the plug 15. The plate 24 is smoothly faced on its lower surface so as to seal the holes 17 under the conditions shown in the drawing. A screwed ring 26, which is screwed into the cylindrical piston 11 has a number of radial slots or notches 27 cut into it to serve to screw it into position and as oil passages, as will be seen later. The ring 26 supports on its upper face a part 28, which has a number of radial slots 29 cut in its outer rim for the passage of oil therethrough. The part 28 is bored out centrally to receive the movable valve seating member 21 which it guides. The lower face of the part 28 is faced at 30 to bear upon the upper face of the flange 31 of the valve seating member 21. The top end of the part 28 is faced smoothly to form an oil seal with the lower face of the Belleville spring disc 32, which, in turn, is faced smoothly on its top surface at its outer periphery to form a seal with the bottom surface at the outer periphery of the Belleville spring disc 32' at 33; a screw 36 for initially loading the spring discs 32, 32', is screwed into the threads 36' of the valve seating member 21, bearing down upon the top face of spring disc 32', thus pressing flange 31 against face 30 of the part 28, and at the same time pressing the lower face of disc 32 against the top face of the part 28 at 37. The underside of the cap portion of screw 36 and the upper face of disc 32' at its inner periphery may be machined to form an oil seal or I may interpose between the two adjacent faces resilient packing 34. Below the threaded hole in movable valve member 21, this member is bored out at 39' and is counter-bored at 40 to form a seat for the ball 42. The screw 36 is reduced in diameter at its lower end to form the annulus 42', and a port 43 gives communication between the annulus and the space between the two discs 32 and 32'. The loading screw 36 is bored out centrally to house and guide the ball loading spring 44. A long spiral passage or duct 45 about the outer cylindrical surface of the movable valve seating member 21 gives communication between the space between discs 32 and 32', and a groove 46 in the bottom face of the guide 28. Alternatively, it may lead through a port 46' into the space below the valve seating member 21 if quick follow-up is desired. The parts just described in association with the valve seating member 21 function as a dashpot device to control the follow-up capacity of the member 21 when the valve plunger 18 and associated disc 22, 22' move away from it. An assembly spring 47 of strip metal loads the whole of the assembly against the top face 20 of the valve plunger 18. A plug 15 may be provided with an annular extension 48, to which is screwed one or other of a number of interchangeable end plates 48' each formed with an aperture 50 coaxial with the valve plunger 18. This aperture 50 must be approximately of the same size as, or smaller than, the bore of part 18, the purpose of this being described later.

It is to be understood that the edges of the discs may be sealed by any other means than mere face contact, particularly with respect to the follow-up discs 32 and 32', where a collapsible bellows may be employed instead of two discs.

The device functions as follows: For example, when the device is used as a control piston in an hydraulic shock absorber of the telescopic type, it is attached to a piston rod passing out of the top of the cylinder through a gland. When the piston is moved upwards rapidly, compressing the oil between the gland and the top of the piston, the pressure of oil bears upon the top faces of the discs 32' and 22, and the underside of the discs 32 and 22', deflecting each pair together, owing to the differential pressures between the oil outside them and between them. Simultaneously the oil pressure also bearing on top of the flange 19 causes the valve plunger 18 to be displaced downwards with the disc 22, and since the oil between the discs 32' and 32 can only escape from between them by way of the spiral passage 45 and the port 46, the discs 32' and 32 are not permitted to deflect together at the same rate as the discs 22 and 22'. Therefore, the valve plunger 18 and its associated disc 22 are depressed away from the seating surface 20' of the movable valve seating member 21. Thus oil escapes through the hollow valve plunger 18. However, the differential pressure acting upon the top of the movable member 21, transferred through the head of the screw 36, increases the loading together of the discs 32 and 32', and forces oil through the spiral leakage duct 45 and the port 46 into the space above the discs 22 and 22', and thus the movable valve seating member 21 moves downwards, following up the valve plunger 18 and its discs 22, 22' and thereby increasing the pressure by diminishing the opening. If the movement was very rapid, the travel of the upward stroke would be considerable before the follow-up effect could occur; for example, rapid movement would arise from travelling over a cobbled road and the follow-up effect would be undesirable. If, however, the upward stroke was relatively slow, as would occur for example when travelling round a bend in the road, the follow-up of the movable valve seating member 21 could even coincide with the downward movement of the valve plunger 18, so that blow off would not occur until the full travel downwards of the follow-up valve had taken place, which is what is required. It will be appreciated then that the degree of follow-up will be dependent upon the length and cross-sectional area of the spiral leakage duct 45 and the speed of movement of the piston in the cylinder.

It will be appreciated that early fatigue of the Belleville spring discs 22, 22', 32 and 32' might take place, were they permitted to shut up frequently. It is for this purpose that the interchangeable end plate 48' with orifice 50 is provided. The dimension of this orifice determines the maximum degree to which the parts 18 and 21 can be separated, for when the leakage area between 20 and 20' exceeds the area of the orifice 50, this orifice becomes the pressure controlling factor, and if the flow of oil is increased (by an increase in speed of the upward movement of the piston) above the point where these two areas are equal, the pressure will build up between the orifice 50 and follow-up valve seating member 21, through the port 39 to the space between the discs 22 and 22', and through the ball valve 42 and duct 43 to the space between the discs 32 and 32' and of course by way of the spiral 45 and port 46', to bring about such condition of pressure balance as to restore the valve surfaces 20, 20' to the desired maximum separation as determined by the size of the discharge orifice 50.

When the piston is moved in the opposite direction (downwards) the pressure of oil acting upon the underside of the recuperating valve 24 will lift the whole assembly against the recuperating valve spring 47; thus oil will pass freely through the piston, around discs 22 and 22', through the ports 27 and 29, around discs 32 and 32', and out by way of the holes 14 to the cylinder space above the piston. At the same time oil pressure will raise the ball 42 against the pressure of the spring 44 and pass freely by way of the annulus 42' and port 43 into the space between the discs 32 and 32', so that movable valve seating member 21 can retreat quickly upwards to the position shown in the figure.

If desired the end plate 48' may be integral with the plug 15 and a separate loose ring 48x may be used as the flow constricting member.

As already indicated, the invention as above described may be embodied in various types of shock-absorbing apparatus. For example, in the shock absorber shown in Figure 3 of this application the piston is double-acting and the Belleville washer assembly would be duplicated back to back in a manner similar to that shown in Figure 2 of the specification of my United States Patent No. 2,521,202. In the shock-absorber shown in Figure 4 of this application the Belleville washer assembly would be embodied in the piston precisely as shown in Figure 2 of this application and also in the base of the shock absorber. In the shock absorber shown in Figure 5 of this application the Belleville washer assembly in each piston would be as described above in connection with Figure 3 of this application since again each piston is double-acting.

What I claim is:

1. A hydraulic shock absorber comprising a liquid filled cylinder, a piston reciprocable therein, valve means within the piston permitting restricted flow of the liquid through the piston when the latter moves along the cylinder in one direction, and means also within the piston permitting relatively free flow of the liquid through the piston when the latter moves along the cylinder in the opposite direction, the said flow restricting valve means comprising a valve member and a valve seating member therefor, said valve member being in the form of a pair of dished resilient annular discs placed face to face with their outer peripheries in contact with one another, one disc of the pair being normally seated annularly at its inner periphery against the valve seating member and being subject to deflection by the liquid pressure upon it when the piston moves in the aforesaid one direction, said deflection being away from said seating member and causing an annular opening for the restricted flow of the liquid between the said seating member and the said inner periphery of the said one disc and thence through the pair of discs.

2. A hydraulic shock absorber comprising a liquid filled cylinder, a piston reciprocable therein, valve means within the piston permitting restricted flow of the liquid through the piston when the latter moves along the cylinder in one direction, and means also within the piston permitting relatively free flow of the liquid through the piston when the latter moves along the cylinder in the opposite direction, the said flow restricting valve means comprising a spring loaded valve member, a valve seating member therefor, spring means in the form of a dished resilient annular disc acting on said valve member to normally seat it against said valve seating member, said spring means being subject to deflection caused by liquid pressure when the piston moves in the aforesaid one direction, said deflection being away from the said seating member and causing an annular opening opening for the restricted flow of the liquid between the said seating member and the said valve member and thence through the latter and a centrally apertured obturating member on the flow departure side of the said valve member, the aperture in said obturating member being equal to the maximum opening desired between the valve member and its seating member whereby said disc is hydraulically prevented from being over-deflected.

References Cited in the file of this patent

UNITED STATES PATENTS

| | | |
|---|---|---|
| 1,260,405 | Krussell | Mar. 26, 1918 |
| 1,283,581 | Smith | Nov. 5, 1918 |
| 1,616,091 | Scott | Feb. 1, 1927 |
| 1,988,194 | Erlandsen | Jan. 15, 1935 |
| 2,161,811 | Grebe | June 13, 1939 |
| 2,240,644 | Focht | May 6, 1941 |
| 2,481,088 | Cuskie | Sept. 6, 1949 |